(12) United States Patent
Valenzuela

(10) Patent No.: US 9,681,774 B2
(45) Date of Patent: Jun. 20, 2017

(54) METHOD AND APPARATUS FOR DRAWING CAKES

(71) Applicant: Miguel Valenzuela, San Diego, CA (US)

(72) Inventor: Miguel Valenzuela, San Diego, CA (US)

( * ) Notice: Subject to any disclaimer, the term of this patent is extended or adjusted under 35 U.S.C. 154(b) by 0 days.

(21) Appl. No.: 14/741,367

(22) Filed: Jun. 16, 2015

(65) Prior Publication Data

US 2016/0015210 A1 Jan. 21, 2016

Related U.S. Application Data

(60) Provisional application No. 62/013,529, filed on Jun. 17, 2014.

(51) Int. Cl.
*A47J 27/00* (2006.01)
*A47J 37/06* (2006.01)
*A21B 5/08* (2006.01)
*A21B 5/00* (2006.01)

(52) U.S. Cl.
CPC .............. *A47J 37/067* (2013.01); *A21B 5/00* (2013.01); *A21B 5/08* (2013.01)

(58) Field of Classification Search
CPC ..... A47J 27/00; A23P 1/00; A23P 1/10; A23P 1/12
USPC ....... 99/325, 337, 352, 403, 450.1; 426/113, 426/115, 390, 391, 496, 512
See application file for complete search history.

(56) References Cited

U.S. PATENT DOCUMENTS

| | | | | |
|---|---|---|---|---|
| 2,496,728 A | * | 2/1950 | Laubhan | A21C 3/00 222/470 |
| 4,590,850 A | * | 5/1986 | Hedenberg | A21B 7/005 99/348 |
| 6,280,785 B1 | * | 8/2001 | Yang | A21C 11/163 425/112 |
| 2004/0024472 A1 | * | 2/2004 | Evans | G05B 19/4097 700/2 |
| 2011/0231306 A1 | * | 9/2011 | Stutman | G06Q 10/06 705/39 |
| 2011/0236552 A1 | * | 9/2011 | Vink | A21B 5/03 426/553 |
| 2013/0047864 A1 | * | 2/2013 | Holman | G07F 17/0078 99/325 |

\* cited by examiner

*Primary Examiner* — Michael Laflame Jr.
(74) *Attorney, Agent, or Firm* — Handal & Morofsky LLC

(57) ABSTRACT

A foodstuff making machine comprising a batter dispenser connected to a device for capturing a design to dispense the batter onto a cooking surface with a first controller to control the flow rate and deposit of the batter to result in a desired shape and size of the foodstuff; a second controller that allows for a timed delay between dispensing of said foodstuff to allow subsequent pours to cook longer thereby creating a contrasting color between the foodstuff dispensed at different times; a removable dispensing device controlled by a positive or negative air displacement created by vacuum pump and redirected by one or more valves; and a third controller to control flow rate as well as starting and stopping of batter flow wherein there is no contact of food stuff and mechanical or moving parts.

4 Claims, 6 Drawing Sheets

METHOD AND APPARATUS FOR DRAWING CAKES

The present application claims the benefit of U.S. Provisional Application No. 62/013,529, filed Jun. 17, 2014, and entitled, METHOD AND APPARATUS FOR DRAWING CAKES, which is incorporated herein by reference in its entirety.

INTRODUCTION

Pancake making is well known to all and usually consists of pouring liquid batter onto a hot, greased griddle wherein the batter, because of the heat from the griddle, changes consistency becoming the finished product, namely, a cooked pancake. In place of the hot griddle, one may use another cooking surface such as a frying pan or a hotplate. In commercial pancake making, it is usually a hotplate that is used with vendors making the pancakes to order and sometimes in front of the customer. This type of pancake making is quite craftsman-like, with the vendor using a simple hotplate on a platform, while the pancake batter is kept in a bowl where the batter is withdrawn little by little with a ladle which contains enough batter to make a pancake. Thus, the device used is not efficient, practical, aesthetic, or hygienic.

Both children and adults have always loved specially shaped, fanciful or custom griddlecakes as an extra special treat. But with the exception of professional chefs and a few skilled home cooks like Caroline Ingalls, very few home cooks have the skill to make complicated or even simple shapes. A current method of addressing this need includes pancake molds that are pre-shaped dies, purchased by the consumer and then brought home. While, these dies are slightly easier to use, the user still struggles with the amount of batter that would render the pancake thick enough to be stable, in addition to guessing when it is time to turn. Furthermore inevitably, the pan or griddle or die is not perfectly flat and the batter leaks out ruining the shape. Finally, the user is limited to the shape of the die alone.

On a commercial scale, die cast molds can be made and used to produce a large quantity of particularly shaped pancakes. However, if a customer wants a specialized design, there is an initial expense in producing the die cast molds.

Therefore, there is a need to provide a method and apparatus to allow the production of griddle cakes in whatever user desired shape.

SUMMARY OF INVENTION

The present invention relates to a method and apparatus for making food into user desired designs. The machine is a combination of a batter dispenser that is able to store a volume of batter, that can be moved over a hot griddle or other cooking surface, and a controller to control the flowrate of the batter and location of batter deposit to result in a pancake having a desired shape and size. This invention is applicable to an individual cook as well as the restaurant industry. The control of the batter dispenser in terms of position and flowrate greatly enhances the look, consistency, and quality of pancakes made.

The present invention is more particularly concerned with a liquid dispensing device which is connected to a means for capturing a design and then dispensing the liquid on to a cooking surface to form a foodstuff of said design and a means to control the flowrate of the batter and location of the batter dispenser and the batter deposit to result in a desired shape and size of the cooked foodstuff.

In preferred embodiments, the apparatus is used in connection with pancake batter to make pancakes (griddlecakes) in any design that the user would desire. The design could be input by the user through a number of means. In a preferred embodiment, the design is scanned in through a scanner or input electronically by other means (such as a stylus or mouse, SD card, remotely through a wireless connection) and data from the image is read and sent to a microcontroller which then controls the location of the batter dispenser, dispensing the batter on to the hot griddle at the appropriate rate and in the appropriate motion sequence to result in a griddlecake in the desired shape and cooked. While the invention is particularly useful in connection with pancake batter and a griddle, in an alternative embodiment the apparatus can also be modified to be used over a vat of hot oil to create custom donuts, churros, funnel cakes, jalebis and the like in customized shapes. It is also understood that the terms pancake and griddlecake are used interchangeably. It is also understood these terms include any foodstuff that starts in a liquid, dough or otherwise dispensable or extrudable form that can be cooked on a surface or in another medium. In an alternative embodiment, it is also contemplated that the controllable liquid/dough dispenser can be used in connection with an anti-griddle to make fanciful shapes that are frozen (e.g. custom shaped sorbet lollipops). The user is only limited by their imagination and perhaps their counter space.

BRIEF DESCRIPTION OF DRAWINGS

FIG. 4B shows a side view of the liquid (batter dispensing unit) of FIG. 4a;

DETAILED DESCRIPTION OF PREFERRED EMBODIMENT

The invention is directed to a method and apparatus for distribution of a liquid directly onto a surface, preferably a cooking surface or an apparatus for distribution of a liquid directly into a cooking liquid (such as hot oil) wherein the apparatus can receive images and distribute liquid on to a surface or into the cooking medium in that image. In some embodiments, the apparatus allows for tracing of images and to distribute liquid on to a surface in that image. In preferred embodiments, the apparatus uses pressurized air to extrude the batter, and a vacuum to keep it in place as described below.

Figure 1:
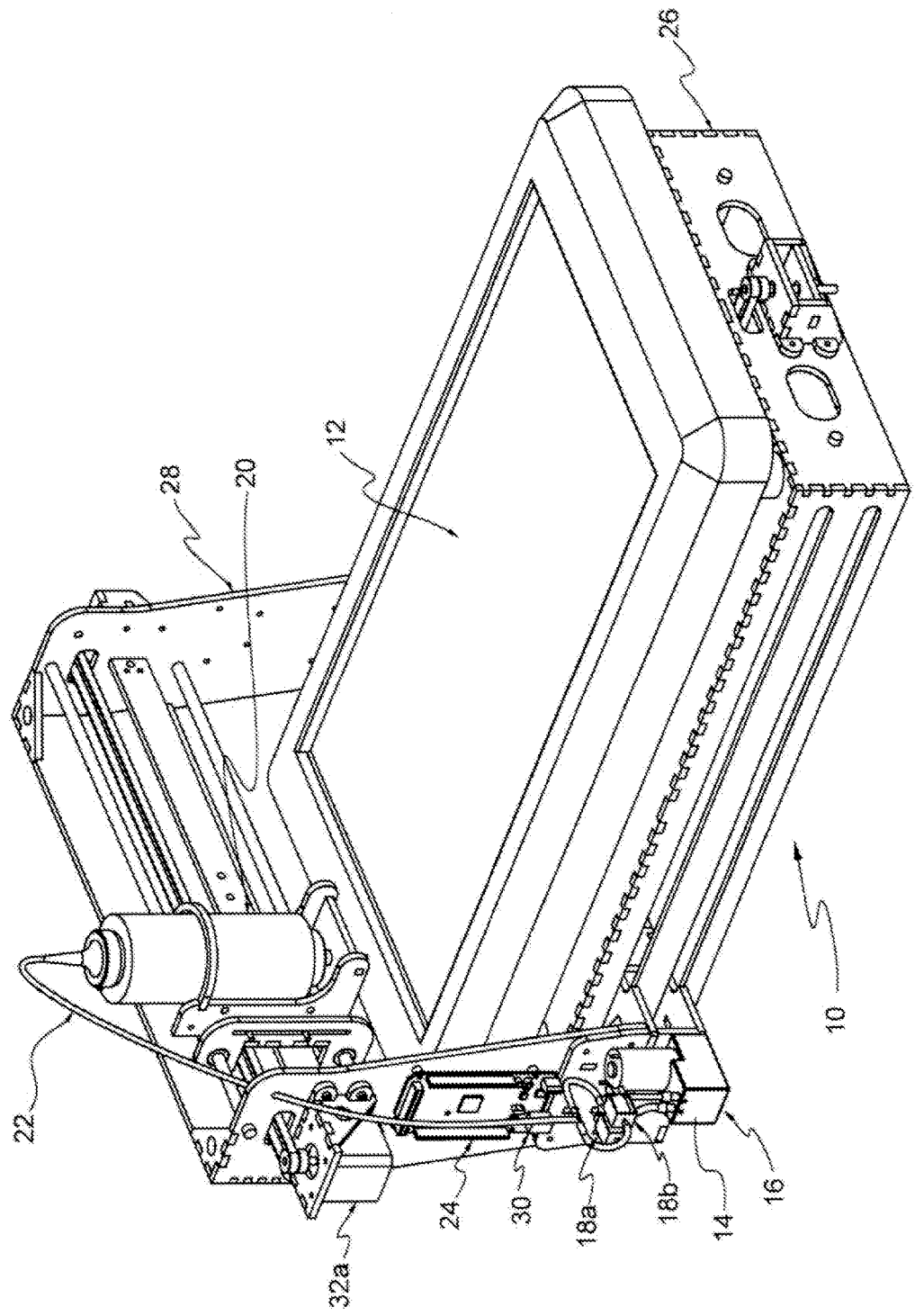
FIG. 1 shows a side top frontal view of a preferred embodiment of the apparatus.

FIGS. 1-5, show a preferred embodiment of the apparatus 10. FIG. 1 shows a side top frontal view of apparatus 10. Apparatus 10 comprises a cooking surface 12, a batter dispenser unit 14 that comprises a vacuum pump 16, a 3 way solenoid valves 18a and 18b, a vessel containing the batter 20.

Apparatus 10 further comprises a controller 24 to control the dispensing of the batter on to cooking surface 12. The cooking surface 12 is removable and sits on top of a base 26 of apparatus 10. Batter dispenser unit 14 is controlled by microcontroller 24 that receives data through a serial connection 30 from a computer or form a remote location through wireless connection (not shown). Batter dispenser 14 is attached to gantry 28 of the CNC (computer numerically controlled) apparatus 10 that allows for location of the vessel containing the batter 20 over griddle 12.

Figure 5A:
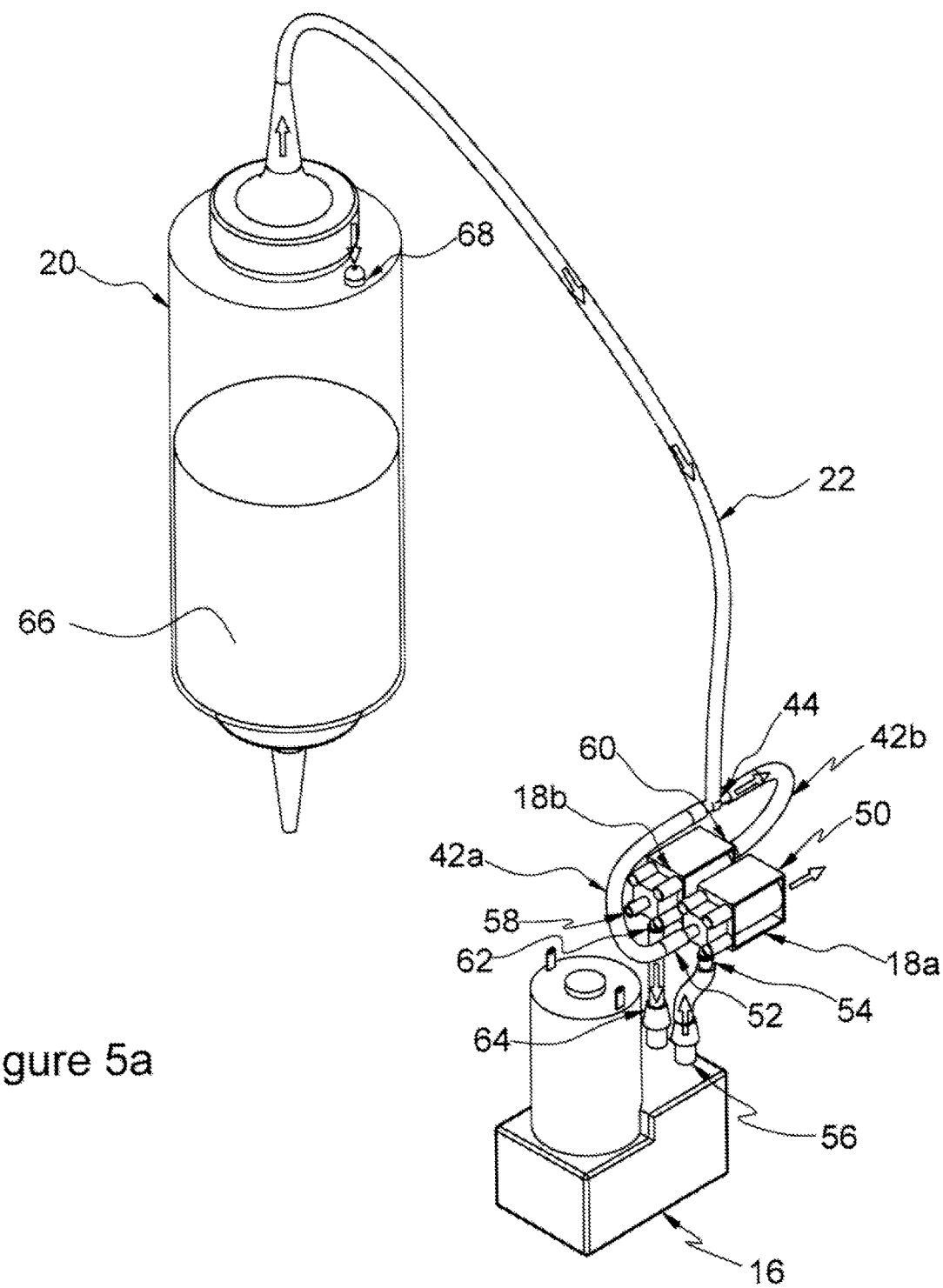
FIG. 5A shows a front, side and top view of the batter dispenser unit.

Flow of the vessel containing the batter 20 is precisely controlled by means of directed flow of air either in the form of a vacuum or pressure which is directed by two three way valves 18a and 18b (shown in greater detail in FIG. 5a) into the vessel containing the liquid 66 (shown in FIG. 5a). A micro controller 24 is mounted directly on gantry 28. Microcontroller 24 comprises a computer and serial input 30 for reading input from a primary computer, stepper motor 32a and 32b shown in FIG. 2, electrical drivers, DC motor drivers, and sensors to sense on/off position of limit switches 34 (shown in FIG. 3) used for zeroing the device into the appropriate corner. A primary computer uses an interface to draw or trace images created by the user. A command sends data through the serial port 30 to microcontroller 24 that then results in movement of stepper motors 32a and 32b in the number of increments designated by the primary computer. Stepper motors 32a and 32b mounted on the gantry 28 and underside of apparatus 10 move the vessel containing the liquid 20 (batter 66) along two axes along a horizontal plane. It is also contemplated that the design can be scanned in or entered in remotely through a wireless connection. In an alternative embodiment (not shown) it is contemplated that the design may be loaded through a SD card, flash drive, removable drive, removable data storage or from a remote location through a wireless connection. Controller 24 may have the ability to store multiple designs. However the design is entered, the liquid batter is dispensed onto surface 12 of the griddle and results in a cooked griddlecake in the shape and size designated by the user.

Figure 2:
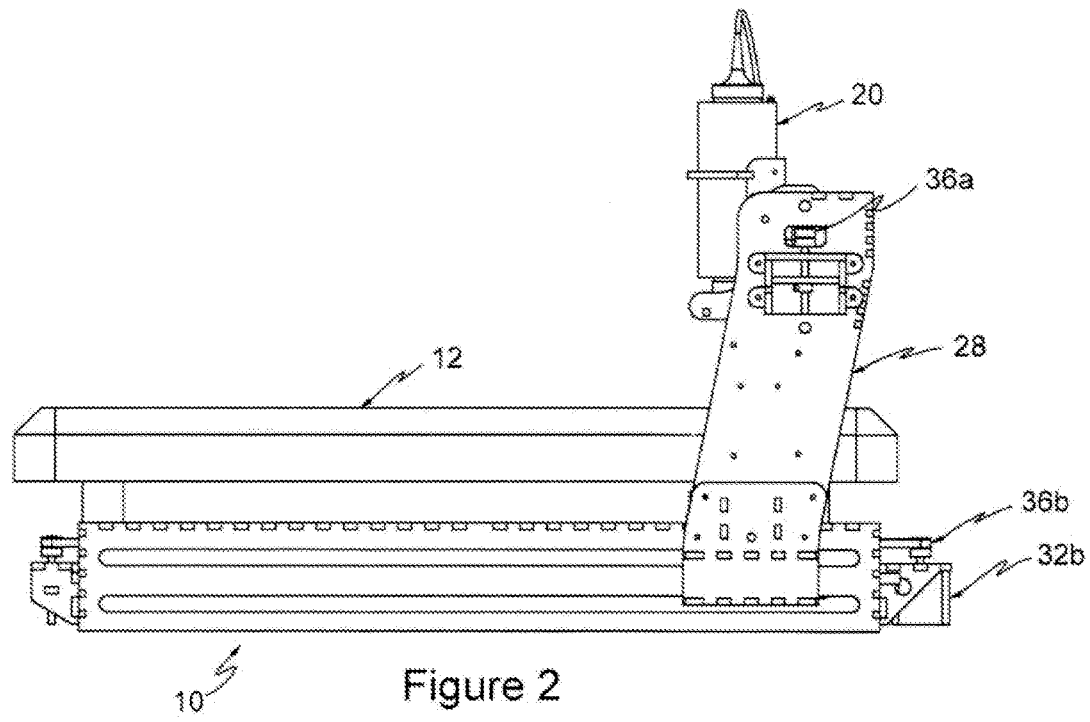
FIG. 2 shows a side view of the apparatus in FIG. 1.

FIG. 2 shows the side view of the apparatus 10 that comprises the cooking surface 12, a liquid dispenser vessel 20, gantry 28, and stepper motor unit 32a and 32b. The stepper motor unit 32a and 32b operates with a belt 36a and 36b that moves the gantry 28 in a back and forth motion which is dictated by the microcontroller 24. The back and forth motion determines the 'X' axis and the location of the liquid dispenser vessel 20 along the flat plane cooking surface 12.

Figure 3:
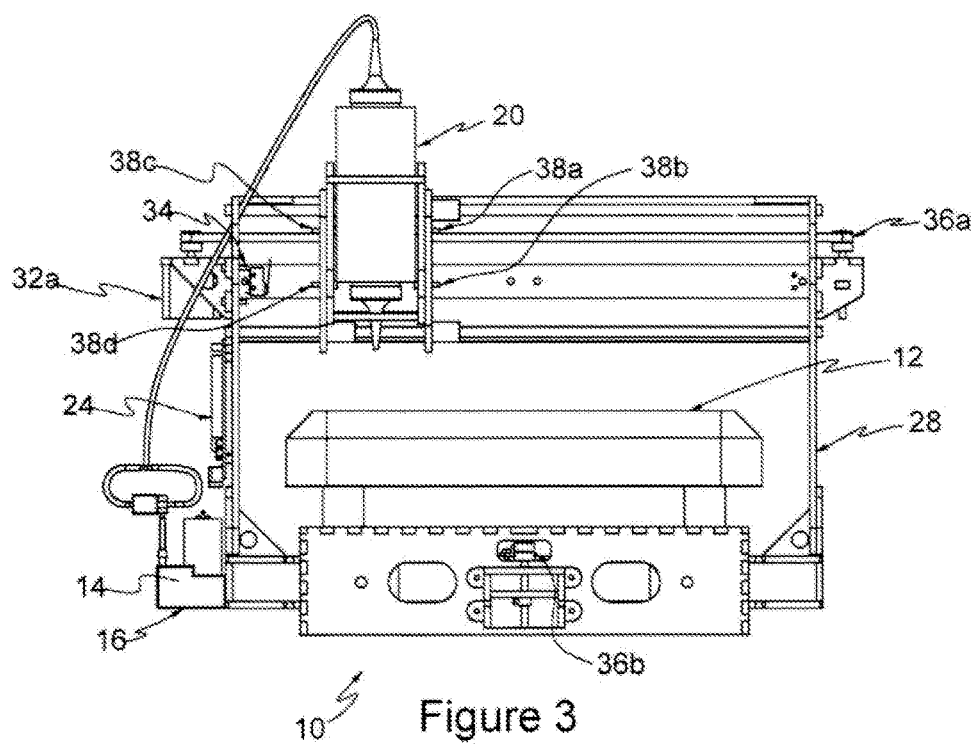
FIG. 3 shows a front view of the apparatus in FIG. 1.

FIG. 3 shows a front view of the apparatus 10 that comprises the cooking surface 12, batter dispenser unit 14, stepper motor unit 32a and 32b (not shown), gantry 28 and belt 36a and 36b. Stepper motor unit 32a and 32b operates with belts 36a and 36b that moves the liquid dispensing vessel 20 in a back and forth motion which is dictated by the microcontroller 24. The back and forth motion determines the 'Y' axis and the location of the batter dispenser vessel 20 along the flat plane. Vacuum pump 16 is mounted on the left side of the gantry 28 and feeds pressurized air of a vacuum into the vessel containing the liquid 20. Vertical adjustments to the vessel containing the liquid 20 are possible by adjustment screws 38a, 38b, 38c, and 38d that allow for sliding of the unit in a vertical position.

Apparatus 10 in a preferred embodiment comprises 1) a vessel to contain liquid with openings on top and bottom; 2) an air hose used to channel forced air; a T-Air hose connected to join air hose to two three way valves; 4) two three-way valves which are OFF in the unpowered 'normal' position and ON in the powered position; 5) a vacuum pump which provides continuous positive and negative air pressure from two separate inlet and outlet ports; and 6) a pressure relief valve for relieving excess pressure from the vessel containing liquid.

Figure 4A:
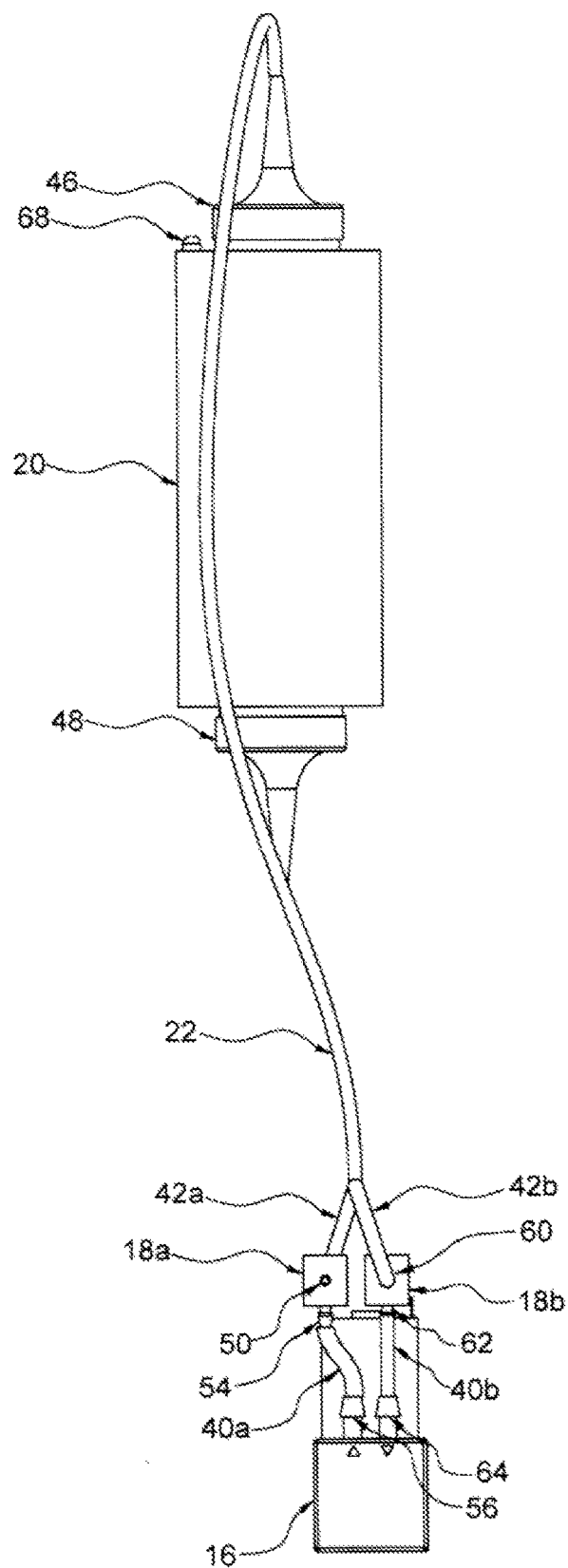
FIG. 4A shows a side view of a preferred embodiment of a batter dispensing unit used in connection with the apparatus of FIG. 1.
Figure 4B:
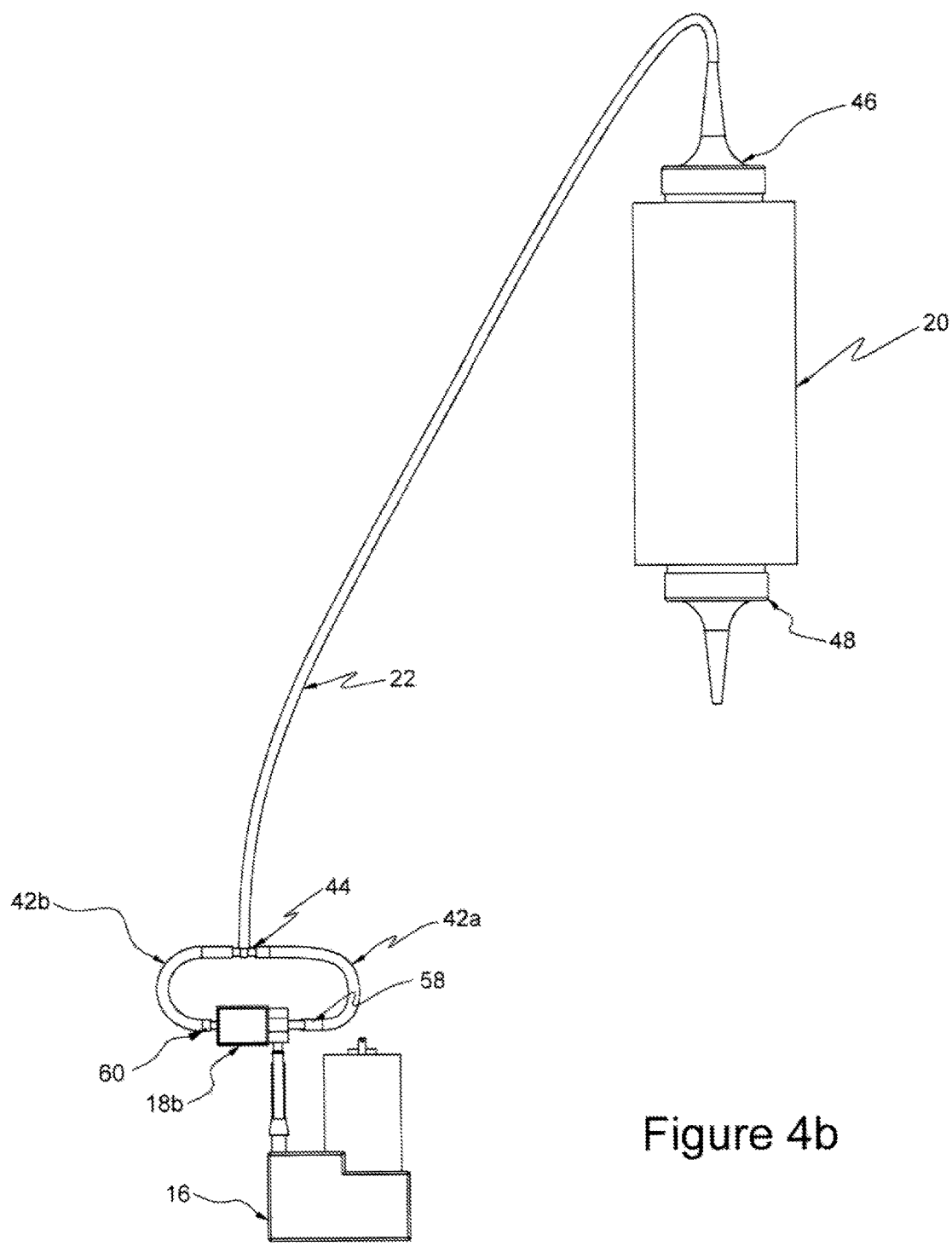

FIGS. 4a and 4b show different views of a preferred embodiment of batter dispensing unit 14. FIG. 4a shows a front view of the batter dispensing unit 14. It comprises of a vacuum pump 16, connecting hoses 40a and 40b which connect to two, three-way valves 18a and 18b, two air hoses 42a and 42b which join with a T-air hose connector 44 (shown in FIG. 4b), an air hose 22 that joins the T-air hose connector 44 to the vessel containing the liquid 20 which has an opening on the top 46 and an opening on the bottom 48, and an bi directional air pressure relief valve 68 located on the top of the vessel containing the liquid 20.

Each of the three way valves 18a and 18b comprise an inlet and two outlets. One outlet 50 of the first three way valve 18a vents to the atmosphere, the other outlet 52 (not shown on FIG. 4a) of the three-way valve connects to the air hose 42a. The inlet 54 to the first three-way valve 18a connects to the positive pressure 56 of the vacuum pump 16.

The second three way valve 18b also comprises an inlet and two outlets. One outlet 58 (not shown in FIG. 4a) of the second three way valve 18b vents to atmosphere, the other outlet 60 of the three-way valve 18b connects to the air hose 42b. The inlet 62 to the second three-way valve 18b connects to the negative (vacuum) 64 of the vacuum pump 16.

FIG. 4b shows the side view of the batter dispensing unit 14. It shows the air hose connections 42a and 42b from the first 18a 18a (not shown on FIG. 4B) and second 18b three-way valve connecting to the T-air hose connection 44 that connects to the vessel containing the liquid 20.

In preferred embodiments, electronics for the switching of two three-way solenoid valves and the pressure and vacuum are produced by a vacuum pump, in lieu of pneumatic valves. In preferred embodiments, apparatus 10 comprises a two-way valve to regulate the pressure in the vessel to keep the pressure constant.

Figure 5B:
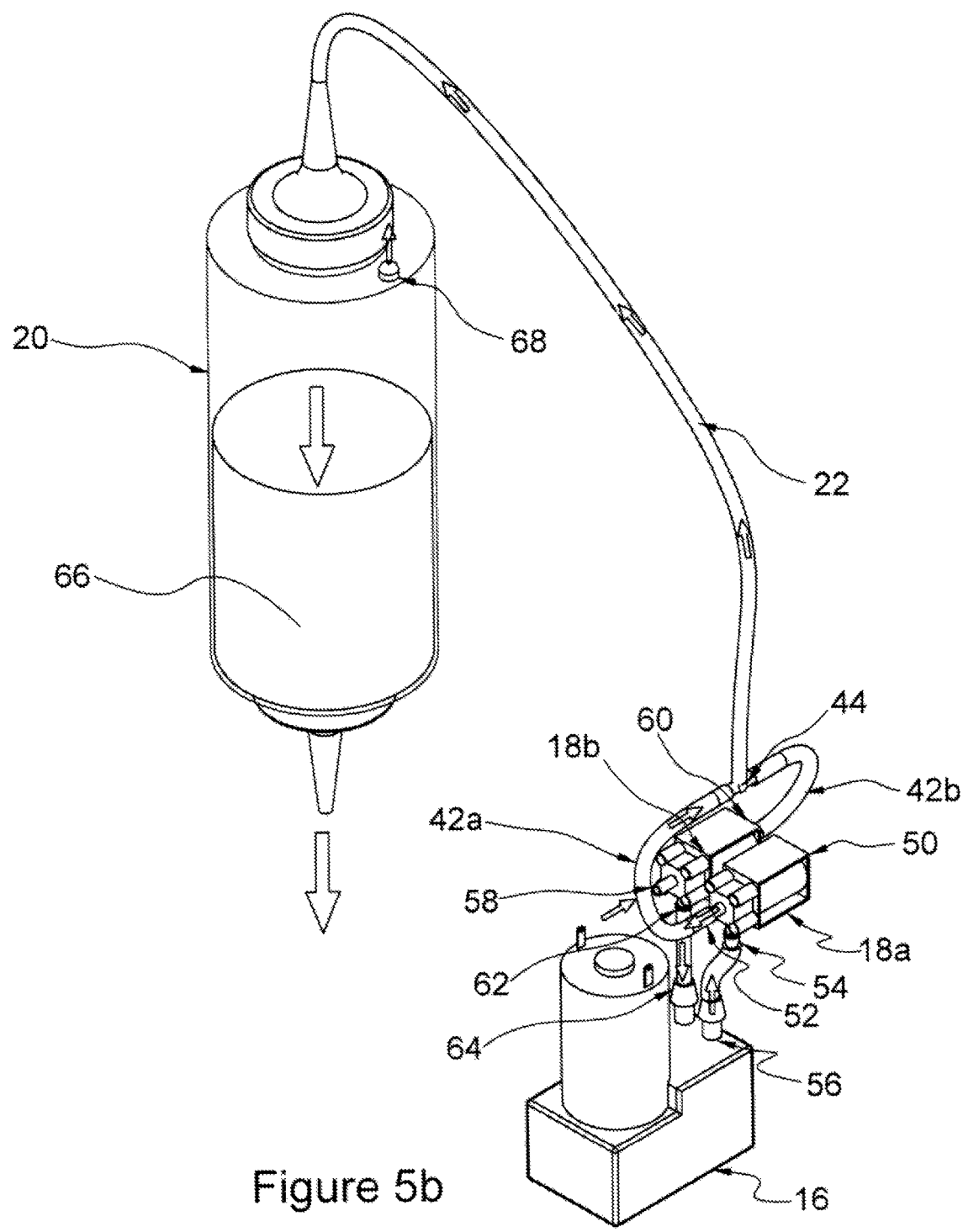
FIG. 5B shows a front, side and top view of the batter dispenser unit.

FIGS. 5a and 5b show isometric views of a preferred embodiment of batter dispenser unit 14. FIG. 5a shows the configuration in the pre-dispensing mode while FIG. 5b shows the configuration when the apparatus is in dispensing mode.

FIG. 5a shows a front, side and top view of the vessel containing batter 20 with arrows dictating the flow of air during the non-dispensing airflow configuration when liquid 66 is being held in vessel 20 (preventing it from spilling out). Vacuum pump 16 is turned on by the microcontroller 24 and both three-way valves 18 and 18b are in the 'normal off' position. Vacuum 16 draws air from the first three-way valve 18a located on the right side of the figure above vacuum pump 16. The air is continually drawn from three-way connector 44 that is connected to the vessel 20 containing the liquid 66 creating a vacuum within vessel 20 containing the liquid retaining the liquid 66 within container 20. Air is vented from the second three-way valve 18b located above the vacuum pump 16 on the left side of the figure that is in the 'off' position.

FIG. 5b shows a (isometric) front, side and top view of batter dispenser unit 14 with arrows dictating the flow of air during the dispensing-air flow configuration. When the liquid is being dispensed, The vacuum pump 16 is turned on by microcontroller 24 and both three way valves 18a and 18b are in the normal on position. Airflow is directed into vacuum pump 16 through the first three-way valve shown 18a on the right side of the figure above the vacuum pump 16. Air flows out into the second three-way valve 18b shown on the left side of the figure above the vacuum pump 16. Air flows from the second three-way valve 18a into the T-air hose connector 44 and flows up through the air hose 22 connecting to the vessel containing the liquid 20. Air pressure builds within the vessel containing the liquid 20 and forces the liquid 66 out onto the cooking surface 12 (not shown in FIG. 5b). The Bi-Directional valve pressure regulator 68 vents excess pressure as defined by the properties of the particular pressure regulator.

To Operate the Apparatus.
1. Turn on Vacuum Pump. Normal non-powered-valve conditions diverts vacuum to vessel containing liquid.
2. Open Vessel from top and pour liquid in vessel while temporarily covering bottom outlet
3. Close vessel. Vacuum Retains liquid in vessel.
4. Power both three-way valves to normal powered position. Pressurized air is diverted into vessel.
5. Liquid flows out.
6. Computer Numerically Controlled Apparatus moves vessel in 2 dimensional plane dispensing liquid in various locations.
7. Power is removed from the valves. Vacuum is diverted into the vessel. Flow stops.

While the above embodiment can be used with pancake batter to make pancakes, it is contemplated that the dispenser can be filled with any liquid mixture (e.g. eggs to make custom shaped omelets). In preferred embodiments, the dispenser is removable, washable and can stored in the fridge. The dispensing hole can be adjusted for thick or thin batters (dosas, crepes). In an alternative embodiment, the dispenser can also be modified with an extruder so that rather than batter, thicker pastes or dough may be deposited on to the cooking surface to make specially shaped cakes. In lieu of a cooking surface, the liquid may be deposited into hot oil to make custom designed fritters such as funnel cakes jalebis or churros. It is also contemplated that the extruder can deposit a non-dough product into a vat containing a non-oil liquid (e.g. paneer into boiling sugar syrup to make custom shaped sweets). The liquid may also be deposited onto an anti-griddle to make custom designed frozen treats. The precise control mechanism controls both the location of liquid or dough deposit and the rate of liquid or dough distribution.

For making pancakes, it is therefore necessary to fill the container with pancake batter liquid in advance and to heat the cooking surface. It is also preferable that the cooking surface be non-stick or pre-oiled. In a preferred embodiment, a timer would be connected to the cooking surface or a sensor to determine when the pancake was cooked. In a further embodiment, it is contemplated that after the dispensing of the batter on to the cooking surface, a second heating element would be on top to cook the cake to eliminate any need for flipping. It is also contemplated that the temperature of the cooking surface or cooking vessel could be controlled depending on what sort of batter is being dispensed (pancake, crepe, dosa, thhepla).

It is further contemplated that multiple liquid dispensers can be attached to the controller to create a multi-colored design (e.g. a daisy with a yellow center and white petals) or multi-flavored (e.g. chocolate and vanilla flavored ying-yang design). Flow rate could be controlled by a similar pressure and air release valve system and the position mechanism would be similar as described above.

For continuous use or commercial use, the dispenser may be attached to cooling mechanism (such as a refrigeration unit) to maintain the batter at a desired temperature.

Accordingly, the reader will see the apparatus dispensing of batter or other liquid in a more productive manner in that the user only has to load the image to dispense batter. It permits the dispensing of batter or other liquid in an evenly smooth flow and into desired fanciful shapes.

The dispensing unit permits the dispensing of batter or other liquid in a more sanitary manner in that the user does not have to dip his hand into a larger container. It permits the dispensing of batter or other batter in a more sanitary manner in that the batter is closed off from pests or airborne contaminates. It permits the dispensing of batter or other batter in a more labor-saving manner in that the user does not have to dip into a large batter container. It permits the dispensing of batter or other batter in a timesaving manner in that the user is not having to constantly refill, and batter is dispense at a faster rate from the pouring wand of the batter or other foodstuff liquid or dough dispenser than can be dispensed from a funnel, pitcher, or batter hopper, It permits the dispensing of batter or other liquid in large volumes. In preferred embodiments, unused batter can be stored in the removable dispenser container to store batter in refrigerator for future reducing waste. The device is safe for children to use as they are never in contact with the hot cooking surface.

It is well understood that the invention is not limited to the methods of accomplishment described and represented in these examples, but it includes all technical equivalents as well as their combinations.

What is claimed:
1. A foodstuff making machine comprising:
   a) a batter dispenser for dispensing batter, connected to a device for capturing a design;
   b) an essentially flat cooking surface on which the batter is dispensed;
   c) a first controller to control the flow rate of the batter and location of batter dispenser and batter deposit to result in a desired shape and size of the foodstuff;
   d) a second controller that allows for a timed delay between dispensing of said foodstuff to allow subsequent pours to cook longer thereby creating a contrasting color between the foodstuff dispensed at different times;
   e) a dispensing device that can be removed by the user and washed separately without having to wash parts where foodstuff would travel through wherein low viscosity foodstuff is isolated from all mechanics and is controlled by a positive or negative air displacement created by vacuum pump and redirected by one or more valves; and
   f) a third controller to control flow rate as well as starting and stopping of batter flow wherein there is no contact of food stuff and mechanical or moving parts.

2. A food preparation device according to claim 1 wherein the design is input by a user.

3. A food preparation device according to claim 1 wherein the design is input by electronically and the order of the data entered is tracked and data from the design is read and sent to a microcontroller which then controls the location of the batter dispenser, dispensing the batter on to the cooking surface at the appropriate rate and in the appropriate motion sequence based on the order of data entered by the user to result in the foodstuff in the desired shape and cooked.

4. A food preparation device according to claim 1 wherein the design is downloaded from a remote location through a wireless connection.

* * * * *